United States Patent
Dasdan et al.

(10) Patent No.: US 11,829,709 B2
(45) Date of Patent: Nov. 28, 2023

(54) METHODS AND SYSTEMS FOR GENERATING AUTOMATIONS FOR ORGANIZING AND DISPLAYING DOCUMENTS IN CONTENT COLLABORATION PLATFORMS

(71) Applicants: Atlassian Pty Ltd., Sydney (AU); Atlassian Inc., San Francisco, CA (US)

(72) Inventors: Ali Dasdan, Mountain View, CA (US); Thirumalaivelu Alagianambi, Mountain View, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 150 days.

(21) Appl. No.: 17/488,622

(22) Filed: Sep. 29, 2021

(65) Prior Publication Data

US 2023/0101588 A1    Mar. 30, 2023

(51) Int. Cl.
*G06F 40/137* (2020.01)
*G06F 3/0482* (2013.01)
*G06F 40/14* (2020.01)
*G06F 40/186* (2020.01)
*G06F 3/04842* (2022.01)

(52) U.S. Cl.
CPC .......... *G06F 40/137* (2020.01); *G06F 3/0482* (2013.01); *G06F 3/04842* (2013.01); *G06F 40/14* (2020.01); *G06F 40/186* (2020.01)

(58) Field of Classification Search
CPC .... G06F 3/0482; G06F 3/04842; G06F 40/14; G06F 40/137; G06F 40/186; G06F 40/174
See application file for complete search history.

(56) References Cited

U.S. PATENT DOCUMENTS

| | | | |
|---|---|---|---|
| 7,168,035 B1 * | 1/2007 | Bell | G06F 40/143 715/745 |
| 9,785,307 B1 * | 10/2017 | Ganesan | G06F 3/0483 |
| 10,706,166 B1 * | 7/2020 | Mandadi | G06F 16/2379 |

(Continued)

*Primary Examiner* — Scott T Baderman
*Assistant Examiner* — Mario M Velez-Lopez
(74) *Attorney, Agent, or Firm* — Brownstein Hyatt Farber Schreck, LLP

(57) ABSTRACT

Embodiments include generating automations for a content collaboration system. Generating automations can include displaying graphical objects corresponding to documents hosted by the content collaboration system at a navigation pane of the content collaboration system and determining a deviation metric using a hierarchical structure of the graphical objects and a reference structure. In response to the deviation metric satisfying a criteria, an automation rule for the change to the hierarchical structure of the displayed graphical objects can be displayed. The automation rule can include a reference between a graphical object of the displayed graphical objects and a root reference and a change to the reference between the graphical object and the root reference. Embodiments can also include executing the automation rule to update the hierarchical structure of the displayed graphical objects and update hierarchical structures of the one or more additional graphical objects hosted by the collaboration system.

9 Claims, 12 Drawing Sheets

(56) References Cited

U.S. PATENT DOCUMENTS

| | | | |
|---|---|---|---|
| 2004/0060003 A1* | 3/2004 | Mani | G06F 40/154 |
| | | | 715/234 |
| 2004/0220815 A1* | 11/2004 | Belanger | G06F 40/174 |
| | | | 715/200 |
| 2007/0078900 A1* | 4/2007 | Donahue | G06F 21/6245 |
| 2008/0027830 A1* | 1/2008 | Johnson | G06Q 30/0641 |
| | | | 707/E17.116 |
| 2009/0083300 A1* | 3/2009 | Wake | G06F 40/186 |
| | | | 707/999.102 |
| 2012/0192047 A1* | 7/2012 | Slatter | G06F 40/186 |
| | | | 715/202 |
| 2018/0267950 A1* | 9/2018 | de Mello Brandao | G06F 40/30 |
| 2019/0129968 A1* | 5/2019 | Neylan | G06F 16/168 |
| 2020/0195721 A1* | 6/2020 | Mehta | H04L 67/1097 |
| 2022/0336110 A1* | 10/2022 | Randall | G16H 50/30 |

* cited by examiner

METHODS AND SYSTEMS FOR GENERATING AUTOMATIONS FOR ORGANIZING AND DISPLAYING DOCUMENTS IN CONTENT COLLABORATION PLATFORMS

FIELD

The described embodiments relate to services of a content collaboration platform and, in particular, to systems and methods for generating, suggesting and applying automations for organizing documents and displaying corresponding graphical objects.

BACKGROUND

Organizations may compile and manage one or more content collaboration networks that include information related to the organization's technology infrastructure or other resources. The content collaboration network can include content generated by various users of the information network, which may be formatted, presented or otherwise hosted in a variety of ways. Each user of the content collaboration network can generate content items related to a variety of topics. The content collaboration network can include content generated at many different times. Users of the system typically access content using search functions, page trees, navigation menus or other navigation functions. Some content hosted by the content network can become outdated or infrequently accessed, but may still be displayed in search results or navigation menus. In some cases, it may be desirable to have systems and methods that can allow users of the system to change the organizational format for content items on the content network.

SUMMARY

Embodiments are directed to a computer-implemented method for generating an automation for a content collaboration system. The computer-implemented method can include displaying graphical objects corresponding to documents hosted by the content collaboration system at a navigation pane of the content collaboration system and determining a deviation metric using a hierarchical structure of the documents and a reference structure. In response to the deviation metric satisfying a criteria, the method can include determining a suggested change to the hierarchical structure of documents, wherein the change to the hierarchical structure is based on the reference structure, causing the display of an automation rule for the change to the hierarchical structure of the documents. In response to displaying the automation rule, the method can include causing the display of a first user interface element for accepting the automation rule and a second user interface element for modifying the automation rule. In some cases, the method can include executing the automation rule to in response to receiving an input indicating the acceptance of the automation rule, where executing the rule includes updating the hierarchical structure of the documents. Updating the rule can also include determining one or more additional deviation metrics using a hierarchical structure of one or more additional documents and the reference structure, and in accordance with the automation rule, updating hierarchical structures of the one or more additional documents having a respective deviation metric that satisfies the criteria.

Embodiments are also directed to computer-implemented methods for generating an automation for archiving documents hosted by a content collaboration system. The computer-implemented method can include causing the display of graphical objects corresponding to the documents hosted by the content collaboration system at a navigation pane of the content collaboration system and determining a deviation based on the usage of a document of the documents and a reference metric. In response to the deviation satisfying a criteria, the method can include generating a suggestion to archive the document and causing the display of an automation rule comprising the suggestion to archive the document and a criteria for applying the automation rule to one or more additional documents. In response to causing the display of the automation rule, methods can include causing the display of a first user interface element for accepting the automation rule and a second user interface element for modifying the automation rule. Methods can also include executing the automation rule in response to receiving an input indicating the acceptance of the automation rule, where executing the automation rule includes archiving the document. Executing the automation rule can also include determining one or more additional deviations based on the usage of one or more additional documents and the reference metric and in accordance with the automation rule, updating storage structures of the one or more additional documents having a respective deviation that satisfies the criteria.

Embodiments are further directed to computer-implemented methods for generating an automation for creating templates used to format documents at a content collaboration system. The methods can include receiving a request to generate a new document at the content collaboration system, where the request associated with a user account. In response to receiving the request to generate the new document, methods can include analyzing documents associated with the user account to determine a template attribute and determining a template for generating the new document based on the template attribute. In response to determining the template, methods can include causing the display of an automation rule for creating additional documents at the content collaboration system, where the automation rule includes a reference to the determined template and a criteria for applying the automation rule to the additional content items. In response to causing the display of the automation rule, methods can include causing the display of a first user interface element for accepting the automation rule and a second user interface element for modifying the automation rule, and in response to receiving the input indicating the acceptance of the automation rule, executing the automation rule to applying the template to the new document.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
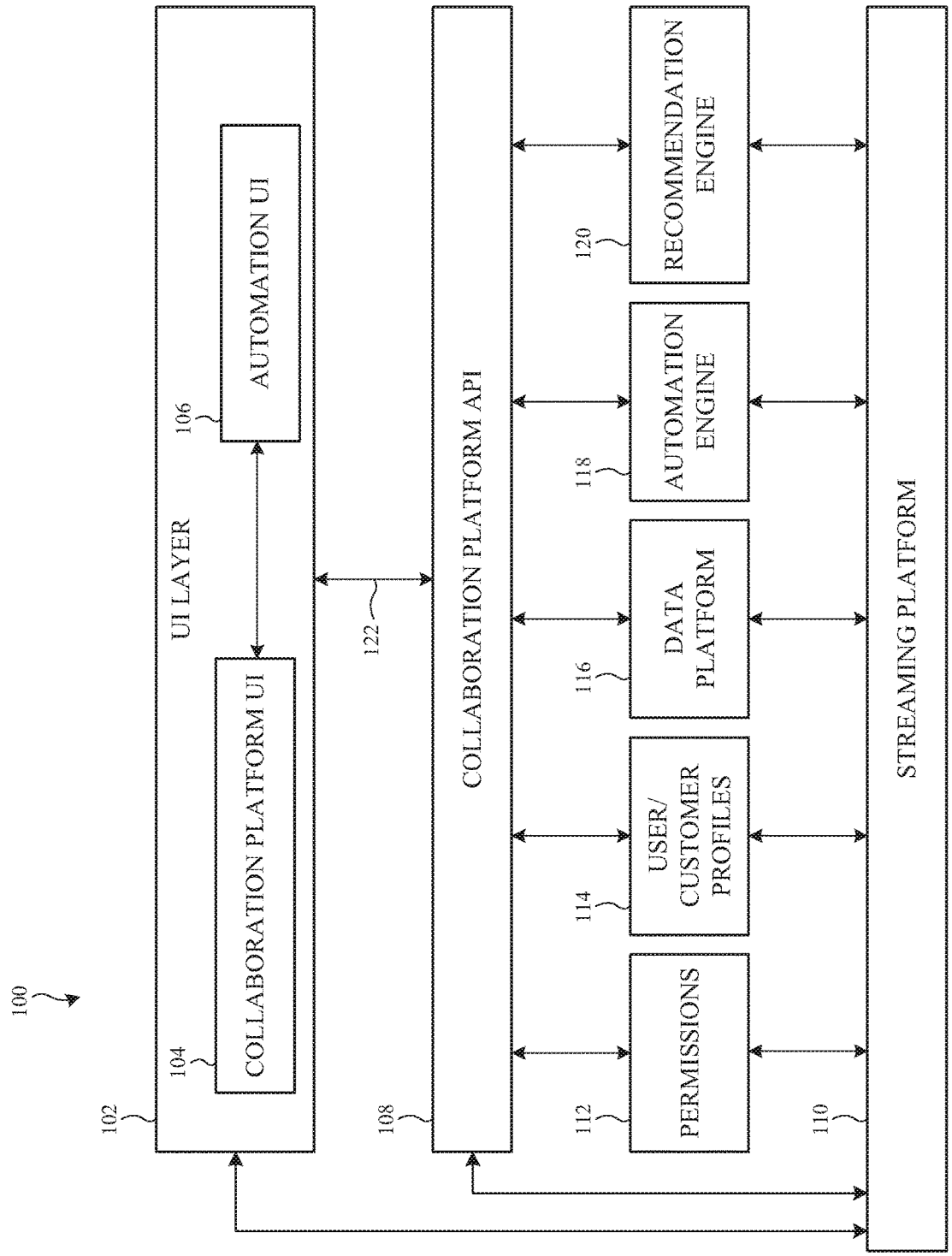
FIG. 1 shows an example collaboration system for generating automations for documents hosted by the collaboration system.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments disclosed herein are directed to generating automations that can be used to automate or replicate tasks that are typically manually performed by a user of a computer service. In some cases, the systems and methods described herein can be configured to identify a task for automation, generate a proposed automation related to the identified task and present the automation to a user of the system. The automations described herein can be implemented for a variety of computer services and/or computer service platforms including for actions related to document management systems such as wiki systems, code development platforms, issue management system such as an issue tracking system for a code development platform, content feed systems, template creation, archiving or other suitable systems, services or actions. Identifying a task for automation can include monitoring a user's interaction with a particular system. In some cases, an automation can be created and suggested based on a type of content item the user is creating, a group or team associated with content item(s) and so on. In other cases, an automation can be created and/or suggested based on a type of action a user is performing. This can include tracking and analyzing a user's previous interactions with the service, or program to identify high frequency tasks, or other tasks routinely performed by a user. For example, a series or user event logs or other user interaction records may be analyzed in order to determine a proposed automation rule that is to be presented to the user. In some implementations, the user events or logs are analyzed using a machine-learning model that has been trained using user or event logs and a set of proposed rules or actions to be automated. In some cases, an automation can be created and/or suggested based on analyzing a content item or group of content items and determining if they satisfy a defined criteria. These and other examples are provided herein as illustrative examples of generating automations for various computer services, programs or other digital platforms.

Embodiments disclosed herein are directed to generating automations for creating and managing content items such as documents hosted by a content collaboration system. A content collaboration system can be set up to enable various users within and external to an organization to create, manage, share, and communicate information about various topics. The collaboration system can allow users to create documents and/or other content that can be shared with other users of the system. The content collaboration system can also provide tools to create content and organize content under different topics, groups, or otherwise share their content with users of the collaboration system. Additionally or alternatively, a user may be able to post and/or associate their content with external pages, such as team, group or topic pages. The collaboration system can organize, group, host and share content in a variety of ways, and users of the system may determine how their content gets posted and/or shared. Accordingly, the collaboration system may not have a formal organization scheme, which can result in generated content being redundantly associated with multiple different topics, having individual content items containing similar or the same information. Additionally, such a system may not evaluate the merits of content items, and thus, some content items may include outdate, unhelpful or incorrect information. The amount of content items and their informal nature can make it difficult if not impossible to manually manage, organize, store, structure, and share content items generated by users of the system. Further, the informal nature of generating and posting content items can result in large numbers of relatively unused/un-accessed content items being actively maintained and hosted by the system, which can reduce the performance of the collaboration system. For example, maintaining large numbers of active but un-accessed content items can create lags in searching, navigating, loading and locating content items.

The collaboration system described herein can host one or more content items such as documents. The collaboration system can track the creation, organization, sharing and accessing of these documents to determine automation rules that can be applied to the documents to increase efficiency of the collaboration system. In some cases, the collaboration system can identify inefficient organizational schemes for graphical objects corresponding to documents hosted by the collaboration system. As used herein, the term graphical object is intended to include graphical elements displayed in a user interface that represent a document, example of which can include folder icons, images, names of folders, links and so on. For example, the collaboration system may evaluate a hierarchical organization that is used to display graphical objects and their corresponding relationship to other graphical objects, such as a page tree structure that include nodes and branches indicating a dependence and/or relationships of the corresponding document. In some cases, to increase efficiency of a navigational interface, the collaboration system may compare a current hierarchical data structure to one or more reference data structures and suggest changes to the current hierarchical structure based on the comparison. This may help restructure inefficient and/or confusing hierarchical organization of the graphical objects such as hierarchical structures that have a high degree of branching or hierarchical structures that have a low degree of branching, which may cause the user interface to operate less efficiently due to the amount of data the needs to be retrieved to display the graphical objects.

In other cases, the collaboration system can track and/or evaluate users' interactions with various graphical objects to determine whether changes should be made to the corresponding documents. For example, the collaboration system can identify in-frequently accessed documents and generate automation rules for archiving or moving these documents to longer term storage. The collaboration can generate an automation rule for archiving these documents and present the automation rule to a user of the system. The automation rule can include an explanation of the conditions that would trigger the rule, the actions associated with the rule, and identify a set of documents that would be affected by the rule. In some cases, presenting the automation rule in a user interface can include generating a preview of the effect of the rule on the documents. In response to a user accepting the automation rule, the collaboration system can execute the actions of the rule to the affected documents. For example, an automation rule can specify that all documents that are below a defined access count (e.g., infrequently accessed) are to be archived. In response to the user accepting the automation rule, the collaboration system can archive documents meeting the archiving condition. In some embodiments, displaying an automation rule to a user can include providing the user an option to modify the rule. Accordingly, the user may be able to change one or more parameters of the rule to change the set of documents affected by the rule.

In some embodiments, the collaboration system can generate automation rules for a variety of different documents to increase the efficiency of the system. For example, automation rules can be generated for displaying and organizing page trees that are used to navigate and find documents. In some cases, this can include determining that a branch level beyond a certain threshold is rarely accessed or that it is inefficient to have a single content item under a sub-branch. Accordingly, the collaboration system can generate an automation rule to reorganize the structure of the how the content items are displayed to a user. For example, the automation rule can recommend removing all page tree branches beyond a certain level, and/or reorganizing the documents associated with the eliminated branches. In other cases, the automation rule can recommend eliminating sub-branches that have a single content item and relocate and/or remove the content item. In other cases, the collaboration system can analyze historical data collected by the system and user interactions to identify automation rules for other documents such as generating document templates, modalities for sharing documents, scheduling contexts, alerts, organizing and/or displaying dashboards, creating workflows, migrating data and so on.

In some embodiments, automation rules can be generated for other computer services and/or content items. For example, the system can include an independent and/or integrated automation system that interfaces with computer services such as code repositories, code managements systems, issue tracking systems, content feeds and so on. The automation system can monitor user interactions with these systems and/or content items hosted or managed by these systems to identify automation rules for implementing at these systems. As one example, the automation system can interface with a content feed and monitor a user's interaction with content items that are displayed in their feed along with the user's interactions with other users and/or other content feeds. The automation system can identify actions or task related to a user's sharing of content, such as forwarding particular content, types of content or content from specific sources to other users. For example, the automation system can identify that the user forwards content items from a particular source to the same group of users. In this example, the automation system can generate an automation rule and present the rule to the user for automatically forwarding content items from the source to the identified set of users. In some cases, the triggering condition for generating an automation rule can be based on a threshold, such as the number or percentage of times a user performs a specific action.

As another example, an automation system can be integrated with a code management and/or issue tracking system. For example, the automation system can be configured to track ticket assignments for tickets that are opened in response to various issues. In some cases, the automation system can categorize a type of issue and determine that specific types of issues are frequently assigned to a same user or set of users. In this regard, the automation system can be configured to generate an automation rule that automatically assigns issues to specific users based on an identified type of issue. The automation system can present, in a user interface, the generated rule along with options to implement and/or modify the generated rule. In response to generating the rule, the automation system can implement the rule such as that as new issues are generated at the issue tracking system, the automation system can automatically assign those issues to specific user's based on an identified issue type or other parameters. Once implemented, the automation rule can run without input from the user. In this regard, the efficiency of the issue tracking system can be increased by automatically assigning issues without needing to receive input from a user.

These and other embodiments are discussed below with reference to FIGS. 1-8. However, those skilled in the art will readily appreciate that the detailed description given herein with respect to these Figures is for explanatory purposes only and should not be construed as limiting.

FIG. 1 shows an example collaboration system 100 for generating automations for managing documents hosted by the collaboration system 100. The collaboration system 100 can include a user interface (UI) layer 102, a collaboration platform application programming interface (API) 108 and a streaming platform 110. The collaboration system 100 can also include services such as a permissions service 112, a profiles service 114, a data platform 116, an automation engine 118, and a recommendation engine 120. These components of the system may be communicably coupled via one or more communication links 122 (one of which is labeled for clarity), which may be implemented as any suitable wired or wireless data transfer connection.

In various embodiments, the collaboration system 100 configured to operate within or as a virtual computing environment that is supported by one or more physical servers including one or more hardware resources such as, but not limited to (or required to be) one or more of: a processor; a memory; computer-readable memory or other non-volatile storage; networking connection; and the like, such as those in the electrical block diagram 800 described with reference to FIG. 8. It may be appreciated that although these functional elements are identified as separate and distinct units (e.g., servers) they can each include allocations of physical or virtual resources, such as one or more processors, memory, and/or communication modules (e.g., network connections and the like). The collaboration system 100 can leverage such resources to instantiate a number of discrete subservices or purpose-configured modules, containers, or virtual machines each configured to perform, coordinate, serve, or otherwise provide one or more services, functions, or operations of the collaboration system 100, such as the UI layer 102, the collaboration platform API 108, the streaming platform 110, and so on. The collaboration platform API 108 and the streaming platform 110 may be referred to herein as application platforms or simply platforms, which can reside on the same host server, or in other implementations, they may reside or be provided by a separate or discrete servers.

The collaboration system 100 can be implemented as a content platform that provides a system for various users within and external to an organization to create, manage, share, and communicate about various topics. In some cases, the collaboration system 100 allows users to create, modify, comment on or otherwise share information through document pages that include text, pictures, videos or other suitable types of content. Users of the collaboration system 100 can create pages on various topics, share or otherwise publish their pages for other users to view. In some embodiments, other users, may be able to comment on modify or recommend modifications to a page, and/or link to other content hosted by the collaboration platform or hosted by a system external to the collaboration system 100.

In other cases, the collaboration system 100 can be implemented and/or integrated with other computer services or platforms to generate automations for task performed by these services or platforms. For example, the collaboration system 100 can be implemented as part of a code management system, an issue tracking systems, email management systems, content feeds, chat systems or any other suitable system.

The UI layer 102 can include a collaboration platform UI 104 that manages user interactions with the collaboration system 100, which can include interactions such as creating, viewing, and modifying content that is hosted by the collaboration system 100. The collaboration platform UI 104 can interface with one or more client devices to display graphical user interfaces of the collaboration system 100 on various client devices. The UI layer 102 can receive and process user inputs from a client device, communicate with other portions of the collaboration system such as the collaboration platform API 108, the streaming platform 110, and/or other services, and update the client device accordingly.

The UI layer 102 can also include an automation UI 106 that can enable a user to enter or modify automation rules for managing documents hosted by the collaboration system 100. The automation UI 106 can also enable a user to see the status of existing automation(s), recommendations for additional automations, and/or recommendations for changes to existing automations. In some cases, the collaboration platform UI 104 and the automation UI 106 can be integrated.

The automation UI 106 can be configured for different types of computer services and/or programs for displaying automation rules to a user and receiving user feedback on the automation rule. For example, in the automation UI 106 can interface with computer services such as a code management system, issue tracking system, content feed, chat systems and so on to display automations that are generated for these systems.

The UI layer 102 can work with the collaboration platform API 108 to manage documents hosted by the collaboration system 100. For example, when a user interacts with a client device to create a new page at the collaboration system 100, the collaboration platform UI 104 can submit a page creation request to the collaboration platform API 108 to create a new page document. This can result in generating a unique page identification number, creating space in a data store, launching an editor session for the user to enter content via the UI layer 102, recommending templates to the user, and so on.

In some cases, the collaboration system 100 can include other API that are associated with other types of computer services and/or systems such as APIs that are part of a code management system, issue tracking system, content feed, chat system and so on. In this regard, the UI layer 102 can interface with various systems APIs to retrieve information related to actions performed by these services.

The streaming platform 110 can enable clients of the platform to push and/or pull information from the collaboration system. For example, in cases where the collaborations system includes a document management platform, the streaming platform can push documents to the collaboration system and/or pull documents from the collaboration system. In some cases, the streaming platform can allow clients to update (e.g., push or pull) documents in real time. The streaming platform 110 can be designed to notify client devices of update events such as push or pull operations performed on documents. In some embodiments, the streaming platform 110 can support services such as the permissions service 112, the profiles service 114, the data platform 116, the automation engine 118 and/or the recommendation engine 120.

The permissions service 112 can enable which actions a given user may perform with different resources, documents or other information of the collaboration system 100. The permissions service can be used to manage user access to documents such as various spaces and/or pages. For example, a user may be allowed to create, edit, comment and structure documents associated with their own content space, but only be able to read and comment on documents associated created and/or managed by other users. In some cases, the permission service 112 gives different permissions to different users. For example, some user may be assigned administrator privileges, which may give them more access to documents, such as the ability to edit, delete, structure/organize, format, or otherwise manipulate documents for other users of the system. In some cases, the permissions service 112 may manage special permission for specific users and/or other services such as the automations engines that allows operations such as updating hierarchical structures of hosted documents, archiving documents, creating templates and so on, which can include broader system side privileges. Additionally or alternatively, the permissions granted to the automation may correspond to those granted to the user, which may help avoid a permissions breach through the automation system.

The profiles service 114 can include information about users of the collaboration system 100. The profile service 114 can identify a customer, such as an organization that utilizes the collaboration platform 100 and provide the collaboration platform 100 for members of the organization. The profiles service 114 can also include profile information for members of the organization such as usernames, authentication credentials, email addresses, team associations, organizational roles, and so on.

The data platform 116 can enable storing and processing of data that is generated from user interactions with the collaboration system 100. The data platform 116 can continuously collect data from UI layer 102, the collaboration platform API 108, the streaming platform 110, and/or other services or internal and/or external data sources. The data platform 116 enables machine learning on the collected data sets, enables data mining pipelines, or otherwise allows processing of user interaction data with the collaboration system 100. In some embodiments, the data platform 116 may be used to generate recommendations and/or automations that are presented to users interacting with the collaboration system 100 as described herein. In some embodiments, the data platform 116 manage the hierarchical structure of documents hosted by the collaboration system, which can affect how the corresponding graphical objects are displayed. The data platform 116 can also manage archival storage and moving documents between different types of storage. In some cases, there can be multiple levels of storage such as a main level storage for documents that can be directly accessed by the collaboration system, a first level of archival storage, which may allow indirect access of documents, for example, through use of an archival program, or the like, and long term storage, which may preserve documents for longer periods, but access to these document is harder.

The automation engine 118 can execute recommendations and apply rules to documents hosted by the collaboration system 100. The automation engine may interface with the collaboration platform API to update, create, archive, or otherwise make changes to documents and/or other content hosted by the collaboration platform. In some cases, the rules may be suggested and accepted by a user, manually input by the user, or otherwise derived by the collaboration system 100 as described herein. The automation engine 118 can implement rules in a variety of ways including scheduling rules to execute on documents and/or other content items at defined intervals, under conditions associated with a particular rule, or the like. In some cases, the automation engine can execute recommendations to subsets of objects hosted by the collaboration system 100, which may include defined subsets of documents, particular types of documents, documents meeting defined criteria, or the like, as described herein. The automation engine 118 can generate recommendation in response to a variety of triggers including user interactions with documents, acceptance of a proposed automation rule, in response to request to create new documents, and so on.

The recommendation engine 120 can generate recommendations for automations that can be applied to documents, content items, or other digital objects of the collaboration system 100. The recommendation engine 120 can analyze user interactions with the collaboration system, analyze history data such as stored at data platform, or analyze other data to derive automations for recommending to users of the system. The recommendation engine 120 can used event logs, user profiles and/or associated data, contextual data, and/or the like for generating information. For example, the recommendation engine 120 can track how users interact with the system and analyze this data to generate automation rules that can be proposed to users of the system. In some cases, the recommendations may be in the form of a document, such as a template for presenting content at the collaboration system 100. In other cases, the recommendations can automate how documents are searched or displayed such as a page tree, search results, and the like. In some cases, the recommendations can include archiving or moving documents to longer term storage. In other cases, the recommendations can be user-specific automations are based on historical interactions between various users of the system. The recommendation engine 120 can generate these as well as other automations for managing documents hosted by the collaboration system 100 as described herein.

Figure 2:
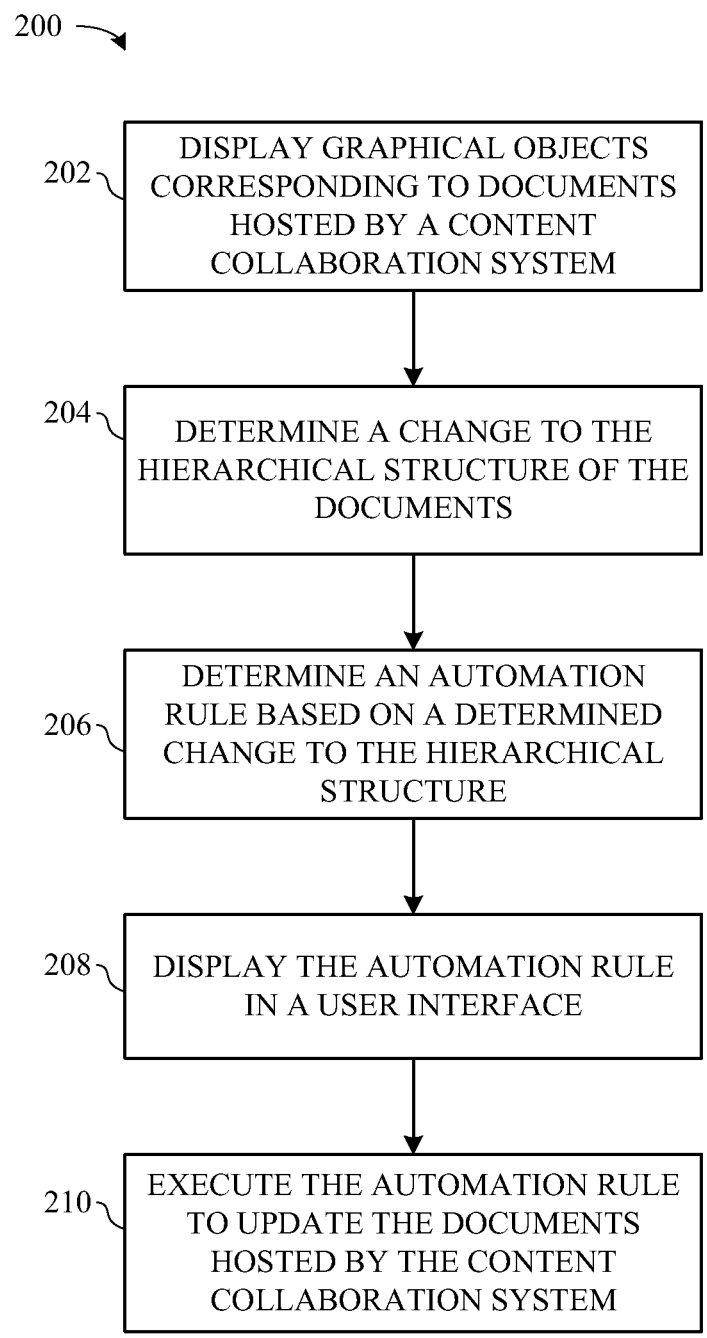
FIG. 2 shows an example process for generating an automation rule for managing documents.

FIG. 2 shows an example process 200 for generating an automation rule for managing documents based on user interactions with a collaboration system. The process may be performed by a content collaboration system such as the collaboration system 100 described herein.

At step 202 the process 200 can include displaying graphical objects corresponding to one or more documents hosted by the content collaboration system. The navigation pane can display graphical documents such as links to content pages, documents, or other digital resources hosted by the collaboration system. The navigation pane can display the graphical objects in a variety of structures such as lists formats, nodal formats, as nested folders and/or the like. For example, the navigation pane can organize and display documents in a page tree format that organizes the graphical objects in a branched format based on the documents relationships to each other such as shown in reference to FIGS. 3A-3D. A user may navigate to a particular graphical object by selecting parent objects such as by opening a parent folder or expanding a parent document in a branched list structure. The navigation pane may only display a subset of the available graphical objects associated with the parent object. In this regard, higher order graphical objects may be displayed and selecting one of these graphical objects may result in showing its dependent graphical objects. In other cases, the navigation pane can include a search function that returns a list of graphical objects based on a search query submitted by the user.

Receiving user input at the navigation pane can include receiving indications of user navigation events such as search queries, user inputs selecting documents such as click inputs at a displayed link to a graphical object and so on. The collaboration system can detect user inputs associated with a specific graphical object and/or its corresponding data, such as user inputs selecting a link to a specific graphical object, a result of a search, or other navigational input. The collaboration system can track user interactions associated with specific documents, which can include an access count that tracks a number of times a graphical object is accessed by various users of the systems, various types of interactions with data such as views, comments, edits or other interactions, time spent interacting with documents, and so on. In some cases, the collaboration system stores these interactions as metadata for the corresponding document. In this regard, the collaboration system can develop historical data sets for documents hosted by the system. In other cases, the collaboration system can prompt or otherwise receive a rating for particular documents, which can be used to determine a popularity, usefulness, quality or other metric for an associated document.

At step 204 the process 200 can include determining a change to the hierarchical structure of documents hosted by the collaboration system. In some cases, step 204 can include determining whether a current hierarchical structure of the displayed graphical objects needs to be changed. For example, if the hierarchical structure is too flat (e.g., having too many documents at the same level or too few parent-child dependencies) then most of the graphical objects may be displayed or listed under few (or a single) parent nodes. Displaying theses graphical objects in the navigation pane may include retrieving data and/or metadata associated with each of the documents. Accordingly, in flat hierarchical data structures the collaboration system may need to retrieve and display a large amount of data, which can reduce the efficiency of the system. In other cases, if the hierarchical structure is highly branched, navigating to specific graphical objects may require a user to load multiple levels of objects before displaying the specific graphical object. This can make finding and navigating to the desired object difficult. Accordingly, the collaboration can have one or more reference structures that are used to define specific hierarchical structures. In some cases, the references structure may increase efficiency by defining parameters for organizing dependent relationships of the graphical objects. For example, in nodal hierarchical structures, the reference structure can define a ratio of parent to child graphical objects, which can help the efficiency of displaying and/or navigating the graphical objects. In other examples, the reference structure can be used to define a format that organizes data from different users according to a common theme. For example, the reference structure can be associated with a group of users, such as a team, and as different users of the team create content, the reference structure can be used to organize the corresponding graphical objects into a common format.

In some embodiments, the collaboration system can compare a hierarchical structure of currently displayed documents to a reference structure and determine differences between the structures. In some cases, the reference structure can be a define hierarchical structure with a set level of branching, ratio of parent to child dependencies, and/or the like. In other cases, the reference structure can be a set of metrics or guidelines that indicate a desired structure such as 2-5 levels of parent-child relationships and/or less than 10 documents at a single hierarchical level. The differences can be characterized using a deviation metric which may indicate differences in the amount of branching, a ratio of parent to child documents, and so on. In response to the deviation metric satisfying a criteria, the collaboration system can determine a change to the hierarchical structure of documents displayed in the navigation pane. For example, the criteria may be defined to trigger rearranging the hierarchical structure of the documents when their structure deviates from the reference structure by a defined amount. This can include a difference in the number of branches, a parent-child ratio, or other suitable parameter.

Determining a change to the hierarchical structure of the displayed documents can include determining changes that result in the displayed documents having a hierarchical structure that is closer to the reference structure. For example, the collaboration system can determine changes that would result in the deviation metric being below the criteria.

Additionally or alternatively, the determined changes to the current hierarchical structure can include changes that increase efficiency of displaying the graphical objects such as by displaying fewer graphical objects in the navigation pane. In some cases, the collaboration system can determine a change to the hierarchical structure based on data associated with the documents, such as metadata indicating user interactions with various documents such as event log or event histories. Determining a change to the hierarchical structure can be based on an amount that a particular documents or group of documents is accessed. It can be inefficient for the collaboration system to display documents that are infrequently or rarely accessed. For example, each time a user interacts with a navigation interface the UI layer may need to access files and/or metadata associated with each document that is being displayed in the navigation interface, which can increase the computational load on the collaboration system. Further, displaying infrequently accessed documents can also take up valuable real-estate on the UI and/or make it harder for a user to find relevant information. Accordingly, as a user is interacting with a navigational pane, components of the collaboration platform such as the collaboration platform API 108, the streaming platform 110, and/or various services such as the data platform 116 and the recommendation engine 120 can analyze documents being displayed to the user to determine changes to their organizational structure that effect how or what is displayed in the UI, such as the navigation pane.

In some cases, changes to a storage structure of displayed graphical objects can be based on how many times a particular graphical object being displayed in the navigation pane is selected. For example, the collaboration system can track an access count that indicates a number of times the graphical object is selected and the corresponding document is accessed (e.g., read, commented on, edited, shared, or otherwise interacted with) by users of the collaboration system. If the access account fails to satisfy a threshold, such as a defined number of accesses, an access frequency, or other metric, then the collaboration system determines that the document should not be displayed in the navigation pane. In this regard, the change in storage structure for the document can include a rule that stops the document from being displayed in association with other displayed documents. In some cases, the change in data structure can include archiving the document, sending it to a long-term storage location, deleting the document, or otherwise stopping the collaborations system from displaying the document.

In some embodiments, other types of user inputs can be used to determine whether to change the organizational structure for displayed graphical objects. For example, interactions with documents can be tracked to determine how useful they are to users of the system. This can include prompting users to rate the documents, determining a time of user interaction, whether the users comment on, link to, or otherwise share the document, whether users download or otherwise save an access link to the document and so on. These interactions with a document can be tracked and saved such as by the data platform 116 in collaboration with other components such as the UI layer 102, the collaboration platform API 108, and the streaming platform 110. Accordingly, the collaboration system can track and save previous user interactions with documents that it hosts.

In some cases, determining changes to the hierarchical organization of the documents can be based on how the graphical objects are being displayed. For example, for graphical objects represented in a nodal hierarchical structure, the collaboration system may determine that it is inefficient to have subbranches displaying less than a defined number of graphical objects. Accordingly, the collaboration system can determine that displayed subbranches with less than a defined number of graphical objects should be removed and/or these documents displayed in relation to other branches. Additionally or alternatively, the collaboration system can determine that graphical objects represented beyond a level of branching (e.g., third branch level) are rarely accessed and/or are computationally inefficient to display. In these cases, the collaboration system may determine a change to the structural orientation of the graphical objects in the navigation pane to remove branches beyond that level (e.g., third branch level) and reorganize, archive and/or remove the corresponding graphical objects.

At step 206 the process 200 can include determining an automation rule based on the determined change to the hierarchical structure for one or more of the documents. The automation rule can change the hierarchical structures of additional documents that may not be currently displayed in the UI. Accordingly, in some cases, graphical objects displayed in the UI, such as a navigation pane, can be used to trigger a rule generation process that is applied to the other documents hosted by the system. In other cases, the rule generation process can be initiated in a variety of ways including user-initiated rules, scheduled rules, and so on. In some cases, the recommendation engine can include a machine learning component that can operate to identify potential rules based on analyzing historical data associated with the collaboration system and/or current user interaction data to identify and generate a rule for managing documents hosted by the collaboration system.

The automation rule can be used to change the hierarchical structure of additional documents to achieve a similar result as the determined change to the displayed graphical objects. For example, if the determined change is to reduce branching in the nodal structure of the displayed graphical objects, then the automation rule can apply a similar change to other documents hosted by the content collaboration system that are not current being displayed or otherwise shown in the collaboration system's UI. Accordingly, analyzing user interactions with the collaboration system, such as a navigation pane, can be used to identify efficiency improvements to documents.

In some cases, determining an automation rule to apply to the additional documents hosted by the collaboration system can be based on user permissions for particular documents. The automation rule(s) can be generated for documents in which a user has a defined level of permissions. For example, the collaboration system can assign an administrator level privilege to the documents that are generated by a user and a lower level privilege (e.g., read only) to documents generated by other users. In this regard, the automation rule may be generated or otherwise applied to documents that are generated by the user (e.g., administrator-level privileges). In other cases, automation rules can be generated for documents for other users. In these cases, the automation rules can be sent to users with a defined level of permission with respect to those documents, such as to users who created and/or own the documents, or system administrators who have higher-level privileges with respect to all documents. Accordingly, determining automation rules on a permission-based basis can help increase security by preventing users from modifying or otherwise changing documents that they don't have sufficient privileges to access.

At step 208, the process can include causing the display of the automation rule in the UI of the content collaboration system for the user to review prior to applying the automation to the documents. In some cases, the automation rule can be structured to help a user understand the rule. For example, the rule collaboration system (e.g., automation engine 118) may generate the automation rule in a first format such as a computer readable format. The collaboration system can use that first format to generate a user readable rule such as pseudocode. In some cases, natural language processing can be used to convert from the first computer readable format to a user readable format. In these cases, the automation rule can be displayed to the user in a readable format that explains various aspects of the rule. For example, displaying the automation rule can include an explanation of the automation rule, which can include conditions for applying the automation rule and the associated actions. In some cases, displaying the automation rule can include identification(s) of one or more documents that the automation rule would be applied to, logical operators, Boolean operators, arithmetic operators and so on. In some cases, the automation rule includes editable fields that are pre-populated with values that are determined by the collaboration system (e.g., automation engine 118 and/or recommendation engine 120), but allows these fields to be modified by the user. For example, in the context of changing a hierarchical format for a group of documents, the automation rule may suggest that all documents currently having a first hierarchical level be updated to a new hierarchical level (e.g., from branch level 2 to branch level 3). In this regard, the user hierarchical levels may be modifiable such that a user can modify the rule. Additionally or alternatively, the collaboration system may restrict which documents the automation rule is applied to, for example, based on the user permissions.

In some cases, displaying the automation rule can include displaying one or more user interface elements for performing actions associated with the automation rule. This can include displaying a user interface element for accepting the automation rule, and a user interface element for modifying the automation rule. In some cases, the collaboration system can also display an option to decline the automation rule in the UI.

In some cases, the collaboration system can show a preview of the changes that would occur as a result of implementing the rule. For example, the collaboration system can generate a new window or pane that would show changes to the navigation pane or other interface elements if the automation rule was accepted, such as the removal of some of the documents from the display. Additionally or alternatively, the collaboration can display user interface elements that allow a user to accept or decline the automation rule in response to viewing the effect. In this regard, the preview may help a user to further understand the effect of the automation rule prior to the rule taking effect. In some embodiments, a preview includes a list or affect documents and/or proposed actions that will result from the rule being applied.

At step 210 the process 200 can include updating the documents in accordance with the automation rule. In some cases, this can be in response to a user selecting a user interface element that accepts the automation rule. In other cases, the automation rule can be applied automatically. Applying the automation rule can result in the UI of the collaboration system being updated to reflect changes to the documents. For example, if one or more are archived or otherwise hidden, then the UI layer can update the navigation menu to remove the corresponding graphical objects from the display. Additionally or alternatively, the collaboration platform can update other documents such as metadata, index data, or the like to update the hierarchical structure associated with these documents. Accordingly, the update to the organizational structure of the documents can cause a change to how the graphical objects are displayed. This can include archiving or removing some documents from being shown in the navigation pane and/or search results as a result of one or more user queries.

Figure 3A:
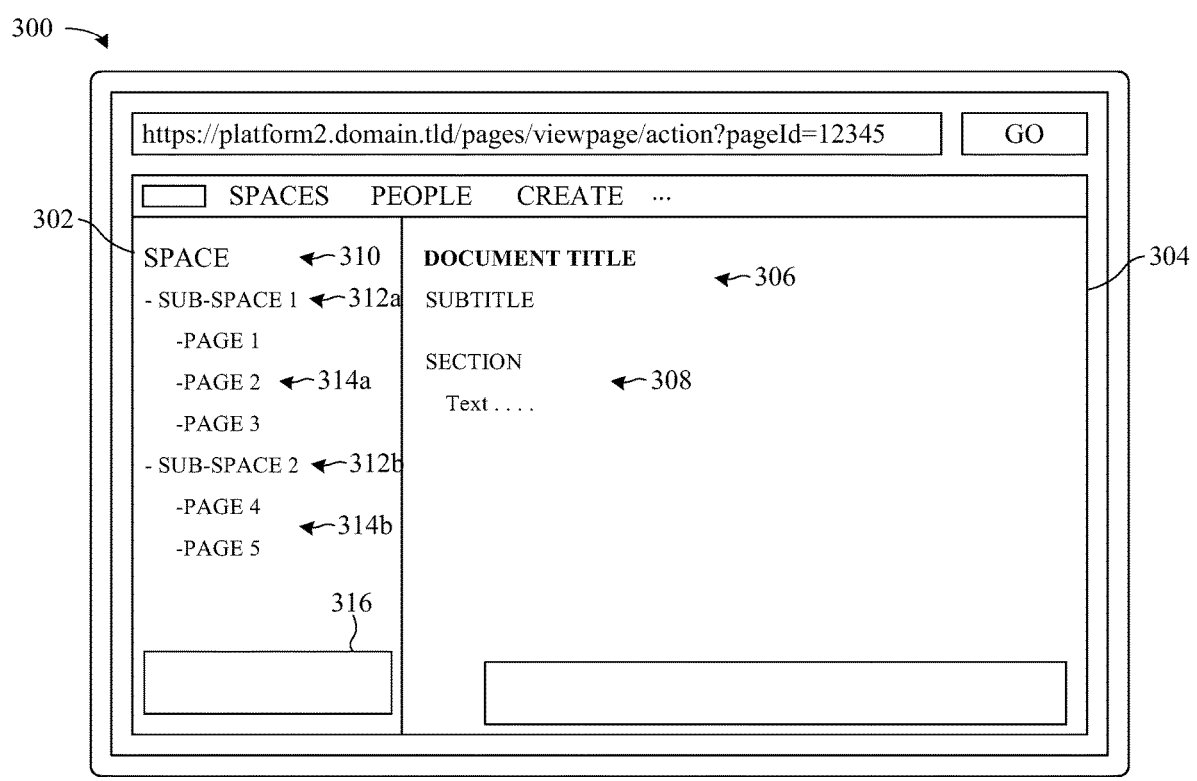
FIG. 3A shows an example user interface for a collaboration system.

FIG. 3A shows an example user interface 300 for a collaboration system, such as the collaboration system 100 described herein. The user interface 300 can include one or more regions or panes that are used to display graphical objects and other information to a user and can include various interface elements that can be selected by a user to perform different functions. For example, the user interface 300 can include a navigation pane 302 that displays graphical objects that are associated with documents hosted by the collaboration system. The user interface 300 can also include a content pane 304 that includes content associated with a particular document, content page, or other content, all of which are referred to herein generically as a document. For example, if a first document is a page, selecting the corresponding graphical object in the navigation pane can result in content associated with the first document being displayed in the content pane 304. In the illustrated example, the content includes a title portion 306 and a text portion 308. Although documents can have a variety of different types of content such as audio, video, animations, pictures, interactive components, and/or the like.

The navigation pane 302 can be organized in a variety of ways. In some cases, as illustrated in FIG. 3A, the navigation pane 302 can have a nodal hierarchical structure that displays references to documents according to their dependent relationships. For example, a first level hierarchical structure can include a space 310, which may be a collection of documents that have a common criteria. In some cases, the space 310 can include documents that belong to or are otherwise associated with a particular user. In some embodiments one or more spaces 310 can be associated with a group, team, department and/or contain content that is grouped according to a similar criteria. Each space 310 can be further organized into sub spaces. For example, as shown in FIG. 3A, the space 310 can include a first sub-space 312a and a second subspace 312b, and each subspace 312 can include references to one or more documents 314 (shown as pages in this example). In other cases, the navigation pane 302 can organize the graphical structures in other ways, which can include additional levels of branching, listing graphical objects according to a common feature, and/or the like. As used herein, the term hierarchical form is used to refer to organizational structures that have parent and child relationships such that some documents are grouped under a parent structure. In these cases, the parent documents/categories may be referred to as nodes that have one or more branches indicating dependent relationships to the parent. In some cases, such hierarchical structures can be referred to as page-tree structures.

In some cases, the navigation pane 302 may display spaces 310 according to a user account. For example, if each user is assigned a space, the navigation pane 302 may show spaces 310 that are assigned to, generated by, or otherwise associated with that particular user account. In other cases, the navigation pane 302 can display spaces 310 based on organizational affiliations, team affiliations, department affiliations, and/or combinations thereof. In some embodiments, the navigation pane 302 can include a search function 316 that can be used to perform text searches and the resulting spaces 310 can be displayed.

Figure 3B:
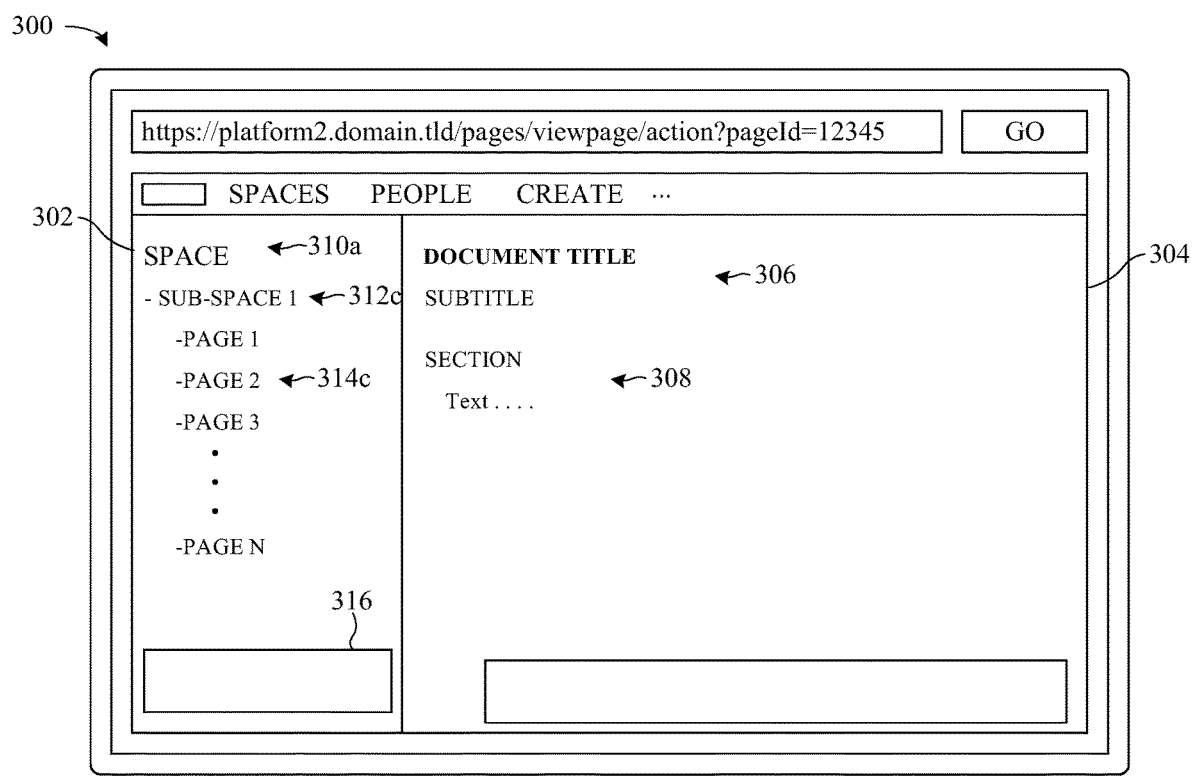
FIG. 3B shows an example user interface for a collaboration system.

As discussed herein, the collaboration system can host a variety of user-generated documents and may display the corresponding graphical objects in the navigation pane 304. In some cases, the hierarchical organization of the graphical objects may be determined by a user creating the corresponding document or other user of the system. This can result in the hierarchical organization of the graphical objects that causes the collaboration system to operate less efficiently. For example, as illustrated in FIG. 3B a first user account may have organized their graphical objects to have a flat hierarchical format, which includes all of the pages 314c organized under a single sub-space 312c. Accordingly, when the collaboration system displays the subspace 312c, the collaboration system may retrieve data associated with each one of the user pages 314c, which can require greater computational load than if a user were to load a subset of the pages 314c. In other examples, users can create hierarchical organizational schemes that may be highly branched, which can also create inefficiencies of displaying graphical objects.

Figure 3C:
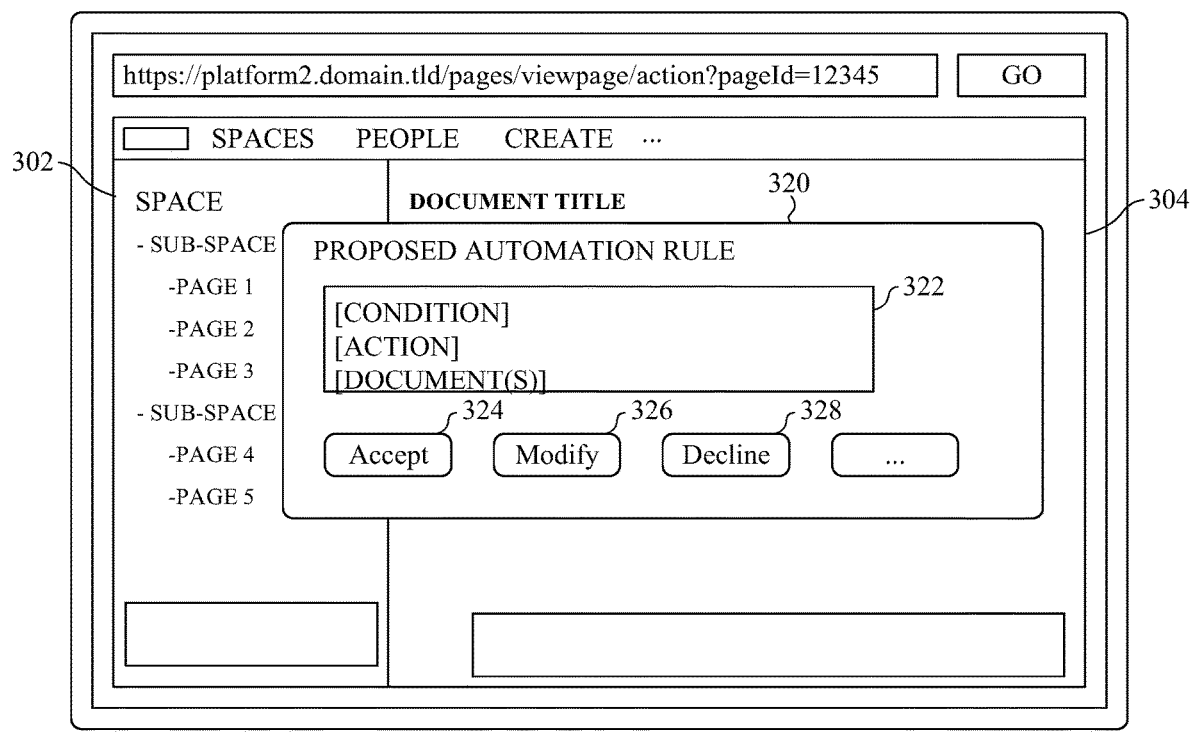
FIG. 3C shows an example of an automation editor that can be used to generate an automation rule for documents hosted by the collaboration system.

FIG. 3C shows an example of an automation editor 320 that can be used to generate an automation rule for documents hosted by the collaboration system. The automation editor 320 can be launched in response to determining a change to the hierarchical structure of one or more graphical objects as described herein. This can include changing the nodal structure that is used to organize the graphical objects in the user interface, archiving documents, removing documents, displaying documents in different sub-spaces and so on. Based on the determined change, the collaboration system can generate an automation rule that can be applied to other documents of the system. In other cases, the automation editor 320 can be launched based on a scheduled or in response to other triggers such as being manually launched by a user.

The automation editor 320 can include a rule explanation field 322, a first user interface element 324 for accepting the rule (e.g., accept button), a second user interface element 326 for modifying the rule (e.g., Modify button) and a third user interface element 328 for declining the rule (e.g., decline button). In some embodiments the rule explanation field 322 can include a natural language explanation of the rule, which can include the conditions that trigger application of the rule and the actions that occur as a result. Additionally or alternatively, the rule explanation field 322 can include pseudocode which can include Boolean operators, logical operators, arithmetic operators, and/or the like.

In response to a user selecting the first user interface element 324, the collaboration system can execute the automation rule on the respective documents, which include documents meeting the defined conditions for applying the automation rule. For example, if the automation rule is to archive documents that have an access count that do not meet a defined threshold, then the collaboration system can archive documents that meet this criteria and stop showing them in the navigation pane 302 or other panes of the user interface 300. Such processes can reduce the number of items displayed to a user thereby improving performance of the collaboration system.

Figure 4:
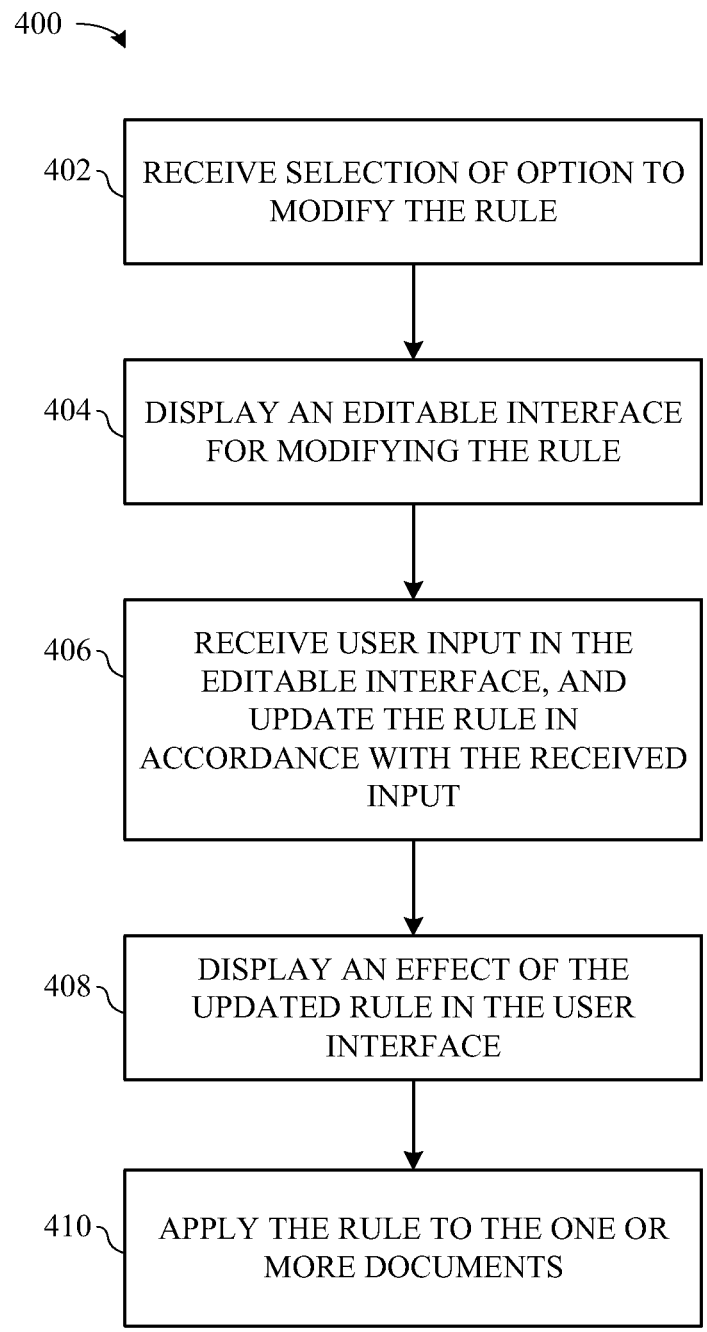
FIG. 4 shows an example process for modifying an automation rule.
Figure 5:
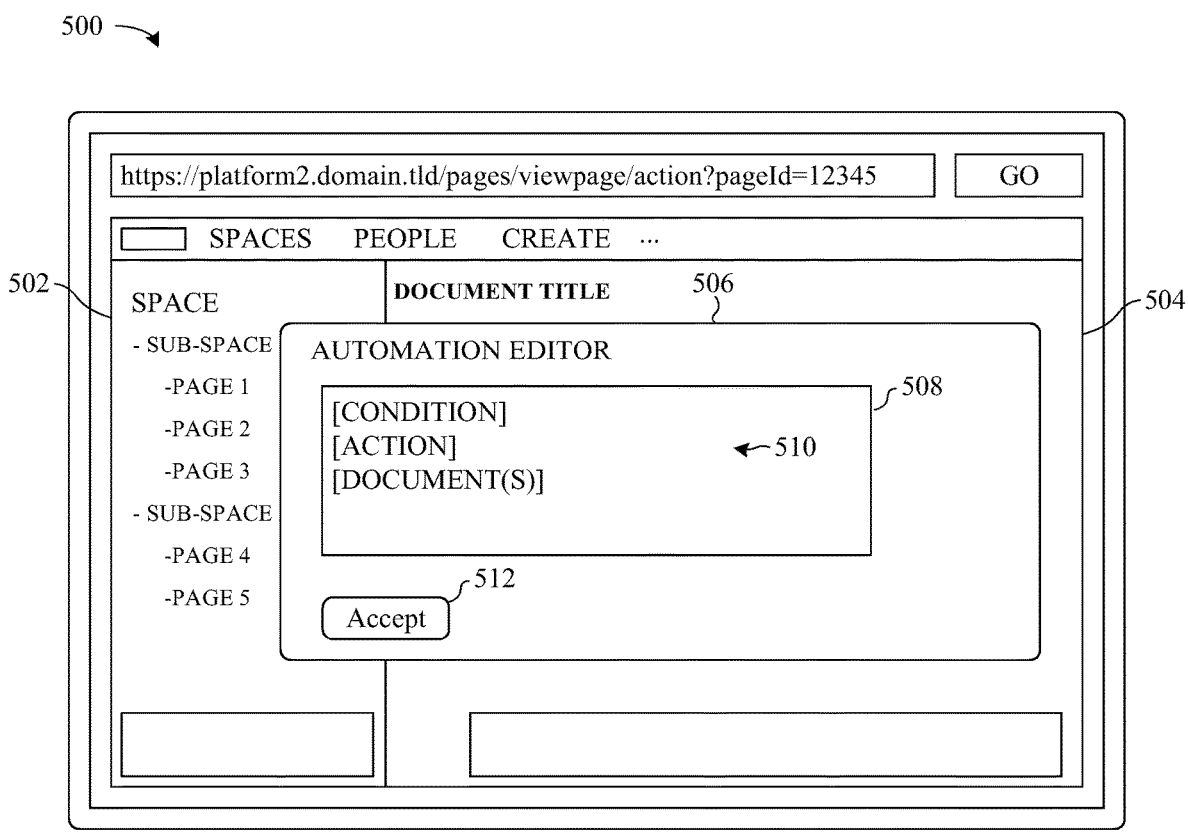
FIG. 5 shows an example user interface for a collaboration system.

In response to the user selecting the second user interface element 326, the system can launch an editing interface as described herein, such as with reference to FIGS. 4-5. In response to the user selecting the third user interface element 328 for declining the rule, the automation editor 320 can close without implementing the proposed automation rule. In some cases, the collaboration system can track whether a user declines an automation rule, and use this tracked information to modify the rule and/or determine whether to propose similar automation rules in the future. For example, if similar or the same automation rule is proposed multiple times and is declined multiple times, then the collaboration system can stop proposing that rule or similar rules. In some cases, this data can be input into machine learning modules that are used to generate the automation rule to refine the rule generation models.

Figure 3D:
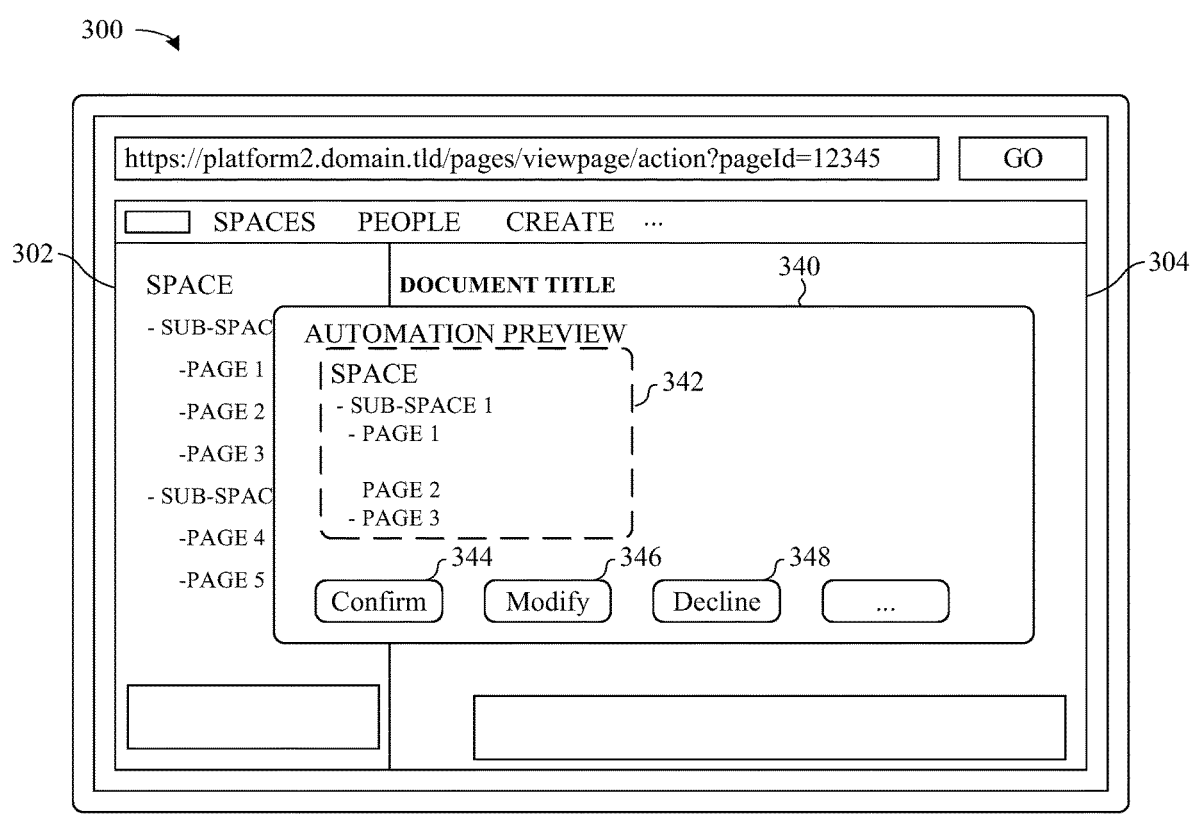
FIG. 3D shows an example of an automation rule preview window.

FIG. 3D shows an example of an automation rule preview window 340 that can be displayed in response to a user selecting the first user interface element 324 to accept the rule. The automation rule preview window 340 can display a preview pane 342 illustrating the effect of the rule on documents that meet the automation rule condition(s). For example, if the automation rule defines a new hierarchical structure for the graphical objects, the preview pane 342 can show an effect of changing the hierarchical structure in the UI. In the illustrated example the determined change may be to add a second sub-space (e.g., "SUB-SPACE 2") to separate the pages into different group. Accordingly, the preview pane 342 can illustrate this effect. In some cases, the preview pane 342 can include a reference between the one or more of the affected graphical objects and higher order data structure such as a root reference, and a change to the references between the graphical object(s) and the root references. For example, the preview pane 342 can show the change to the affected documents, such as the underline illustrated in FIG. 3C, which indicates the changes in the hierarchical structures of "PAGE 2" and "PAGE 3" changing root references from "SUB-SPACE 1" to "SUB-SPACE 2". Showing the change to the affected documents can occur in a variety of ways including highlights, animations, changes in color, or any other effect that differentiates the affected documents from the other documents. In other cases, the preview pane 342 can show the end result without showing the change to the affected document. In the example shown in FIG. 3D this can include adding the "SUB-SPACE 2" graphical object to the space tree.

In some embodiments, the automation rule preview window 340 can also include a first option 344 to confirm the automation rule, a second option 346 to modify the automation rule and a third option 348 to decline the automation rule. In response to a user selecting the first option 344, the collaboration system can execute the automation rule on the respective documents, which include documents meeting the defined conditions for applying the automation rule. In response to the user selecting the second option 346, the collaboration system can launch an editing interface as described herein, such as with reference to FIGS. 4-5. In response to the user selecting the third option 348 for declining the rule, the automation rule preview window 340 can close without implementing the proposed automation rule.

FIG. 4 shows an example process 400 for modifying an automation rule. The process may be performed by a content collaboration system such as the collaboration system 100 described herein.

At step 402 the process 400 can include receiving a selection of an option to modify an automation rule. This can include a selection of the second user interface element 326 as illustrated in FIG. 3C or the second option 346 as illustrated in FIG. 3D.

At step 404 the process 400 can include displaying an editable interface for modifying the rule. The editable interface can include fields that can be modified by the user. In some cases, the modifiable field(s) can change a condition to which graphical object rules will be applied. For example, in the case of changing the hierarchical structure of the displayed graphic objects, the modifiable field can that increases or decreases the amount of branching in the hierarchical structure. Accordingly, if a user decreases the modifiable field, the automation rule may flatten the hierarchical structure of the graphical objects, and if the user increases the modifiable field, the automation rule increases the branching of the hierarchical structure of the documents. In other cases, the field(s) can include options for modifying the proposed action of the rule. For example, in cases of modifying the hierarchy, the action could specify parameters associated with the nodal structure. In further cases, the editable interface can include pseudo-code that can be modified by a user, or the code that will be used to implement the rule. In some cases, the editable interface is based on information about a particular user. For example, the collaboration system may use information about particular user that is stored in customer profile service 114 to determine the type of information to provide in the editable interface. In this regard, a user with an information technology (IT) profile may be provided with the code for implementing the rule, while a user in the business department may be provided with pre-defined input fields (e.g., sliders).

At step 406, the process 400 can include receiving user input in the editable interface and updating the automation rule in accordance with the received input.

At step 408, the process 400 can include displaying an effect of the updated rule in the user interface. This can include updating an automation preview window, such as described herein, to show the effects of the changes to the rule. Additional or alternatively, a summary of the effect of the rule can be provided, which can include information about the effect of the rule such as how many documents the rule would affect, documents belonging to other users that are affected by the rule, and so on. In this regard, a user may be able to modify the rule multiple times to achieve a desired effect before the rule is applied by the collaboration system.

At step 410, the process 400 can include applying the rule to one or more documents that meet the conditions of the rule. In some cases, this can be in response to a user accepting the rule as described herein.

FIG. 5 shows an example user interface 500 for a collaboration system, such as the collaboration system 100 described herein. The user interface 500 can be an example of the user interfaces described herein and include a navigation pane 502 and a content pane 504 such as described herein. The user interface 500 can also include an automation editor 506 that can be used to modify an automation rule that is proposed by the collaboration system.

The automation editor 506 can be launched in response to a user selecting an option to modify an automation such as described herein. In other cases, the automation editor 506 can be automatically included as part of the rule being proposed to a user. The automation editor 506 can include an editable interface 508 that has fields 510 that can be modified by a user. The fields 510 can include parameters that affect the application of the proposed automation rule. For example, the fields 510 can include an editable parameter for modifying a condition for applying the rule to a document (e.g., [CONDITION] field), an editable parameter for modifying an action associated with the automation rule (e.g., [ACTION] field) and an editable parameter for modifying documents that the automation rule is applied to (e.g., [DOCUMENT(S)] field). The editable interface 508 can include other editable parameters, which can be proposed by the automation rule or added by the user in the user interface. In some cases, the editable interface 508 can include fields with a defined range of inputs and the user can enter or select inputs within the defined range. In other cases, the editable interface 508 can include pseudocode, or code that can be edited by a user. In other examples the natural language processing or other word processing techniques can be used to present rules in sentence form and/or convert rules entered by a user in sentence form into machine readable instructions.

The user interface can also include a first user interface element 512 for accepting the modifications to the automation rule. In some cases, accepting the modifications can result in the rule being applied to documents hosted by the collaboration system. In other cases, accepting the modifications can show a preview of the effect of the rule as described here. In other cases, a user may accept modifications and then decide not to apply the rule, such as via the third option 348 to decline the automation rule.

Figure 6:
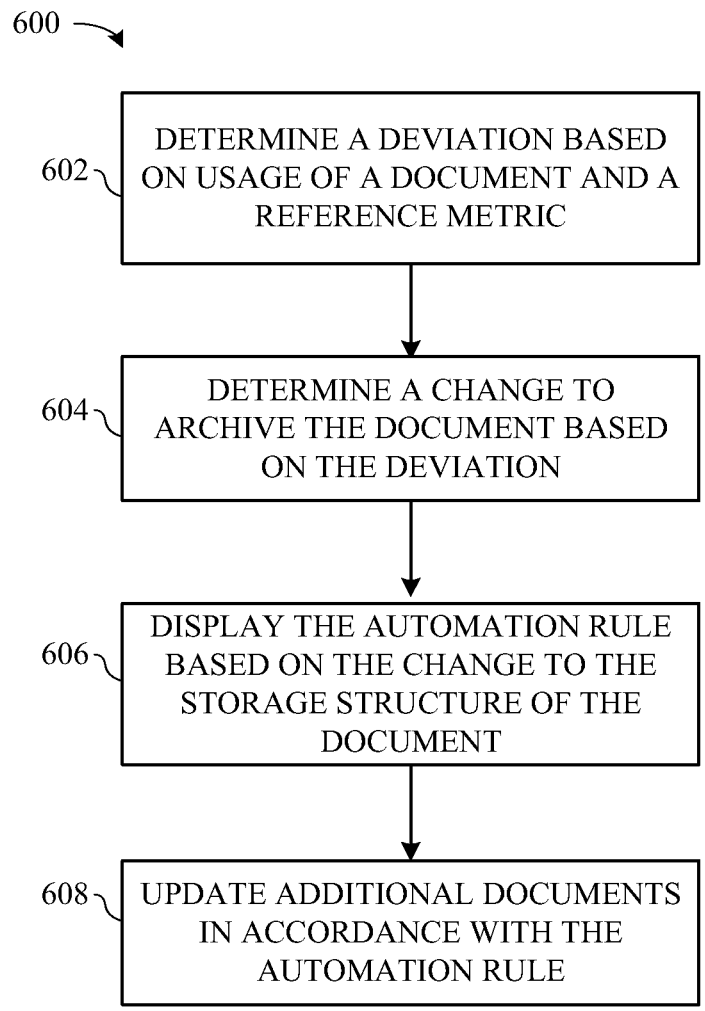
FIG. 6 shows an example process for generating an automation rule for archiving documents.
Figure 7:
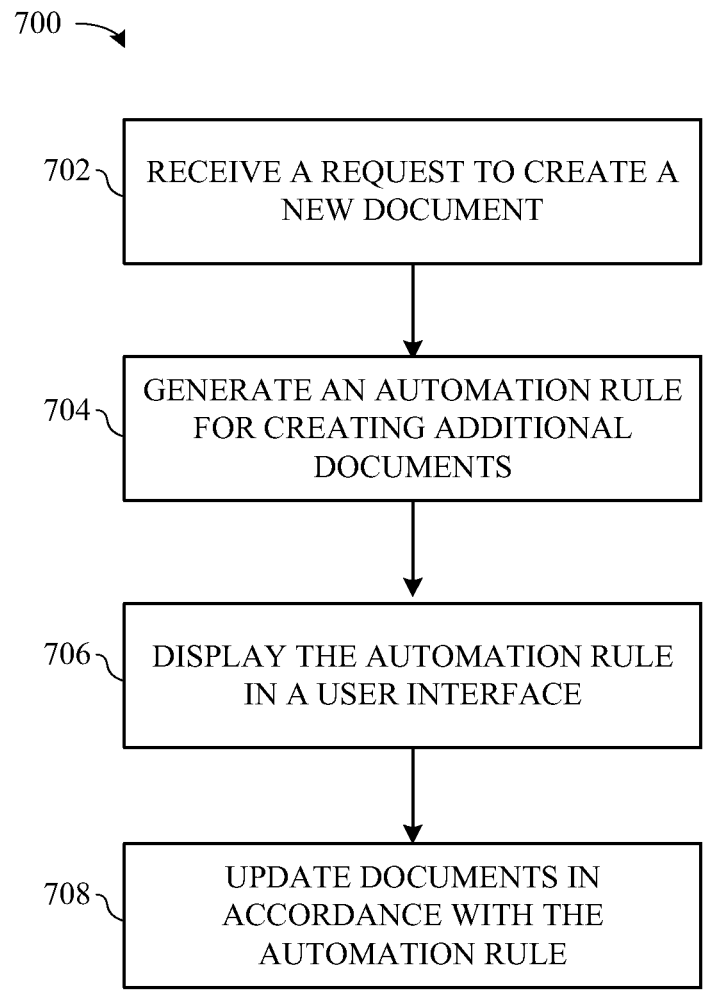
FIG. 7 shows an example process for generating an automation rule for creating document templates.

The systems and processes for generating an automation rule for documents hosted by a collaboration system, such as those described with reference to FIGS. 1-5 can be applied to a variety of other scenarios beyond the examples that have been provided. For example, these systems and process can be applied to contexts that include creating automation rules for archiving, generating templates, messaging applications, dashboard content and/or organization, user alerts, scheduling, messaging, re-organizing the storage and/or display of documents, workflow creation, data migration, and so on. FIGS. 6 and 7 provide additional examples for operating a collaboration platform to generate automation rules for different contexts.

FIG. 6 shows an example process 600 for generating an automation rule for archiving documents. The process may be performed by a content collaboration system such as the collaboration system 100 described herein.

At step 602 the process 600 can include determining a deviation based on usage of documents and a reference metric. In some cases, this can include determining how often documents are accessed. In this regard, the access metric may be determined for documents that correspond to the displayed graphical objects. The usage can be determined in a variety of ways and indicate access properties associated with a graphical object (and the corresponding document), such as how many times the document has been accessed, how often the document is accessed, log information related to accesses such as time, date, user id associated with device/program that accessed the document and so on. The reference metric can be a parameter such as a value that is used to determine whether archive the document and/or display parameters of the corresponding graphical object. For example, a reference metric can be defined to identify a document that infrequently accessed (e.g., have low number of total accesses, haven't been accessed for a defined period of time). In this regard if a deviation between the usage of the document and the reference metric satisfies a criteria, then the content collaboration system can archive the document and/or stop displaying the corresponding graphical object.

In some cases, the reference metric can be an access count the identifies the number of times a document has been accessed. The reference metric can be a defined access count, that specifies a minimum number of accesses for maintaining a current storage structure of the document. In this regard, the criteria may be set to identify documents that have an access count lower than the defined metric. In other cases, the access metric can include a variety of different parameters such as an access frequency, last access date, and so on.

At step 604, the process 600 can include determining to archive the document in response to the deviation metric satisfying a threshold. This can include determining that a document should be move to intermediate storage, moved to long term storage or otherwise migrated to new storage location. In some cases, the change can be to the graphical object corresponding to the document. For example, the collaboration system can maintain a current storage structure of the document, but stop displaying the corresponding graphical object.

At step 606, the process 600 can include displaying the automation rule for the user to review prior to applying the automation to the documents, as described herein. In some cases, displaying the automation rule can include determining an automation rule based on the determination to archive the document. The recommendation engine can include a machine learning component that can operate to identify potential rules based on analyzing historical data associated with the collaboration system and/or current user interaction data to identify and a generate an automation rule for managing documents hosted by the collaboration system. The automation rule can be applied to documents created by the user and/or can be applied to other documents created/owned by other users of the collaboration system. For example, upon generating and executing an automation rule for a first user, the collaboration system can suggest the automation rule be applied to other documents. This can include presenting the automation rule to other user who have documents that meet the rule conditions and/or higher-level users of the collaboration system such as an administrator. Accordingly, automation rules can be generated in the context of analyzing interactions of one or more individual users and applied to a larger set of documents hosted by the system.

Displaying the automation rule can include displaying the deviation based on comparing usage of the document and the reference metric. The automation rule can also include a criteria for applying the automation rule to one or more additional documents hosted by the content collaboration system, such as documents that are not currently being displayed.

Displaying the automation rule can also include displaying one or more user interface elements for performing actions associated with the automation rule. This can include displaying a user interface element for accepting the automation rule, and a user interface element for modifying the automation rule. In some cases, the collaboration system can also display an option to decline the automation rule in the UI.

In some cases, the collaboration system can show a preview of the changes that would occur as a result of implementing the rule. For example, the collaboration system can generate a new window or pane that would show changes to the navigation pane or other interface elements if the automation rule was accepted, such as the removal of some of the documents from the display. Additionally or alternatively the collaboration system can display user interface elements that allow a user to accept or decline the automation rule in response to viewing the effect. In this regard, the preview may help a user to further understand the effect of the automation rule prior to it taking effect.

At step 608 the process 600 can include executing the automation rule to update documents in accordance with the automation rule. In some cases, this can be in response to a user selecting a user interface element that accepts the automation rule. In other cases, the automation rule can be applied automatically. Applying the automation rule can result in the UI of the collaboration system being updated to reflect changes to the documents. For example, if one or more documents being displayed are archived then the UI layer can update the navigation menu to remove these documents from the displayed. Additionally or alternatively, the collaboration platform can update additional documents such as metadata, index data, or the like to update the organizational structure associated with these documents. Accordingly, after the update to the organizational structure of the documents change to how the graphical objects corresponding to the documents are displayed.

FIG. 7 shows an example process 700 for generating an automation rule for creating and/or updating templates for content hosted by the collaboration system. The process may be performed by a content collaboration system such as the collaboration system 100 described herein.

At step 702 the process 700 can include receiving a request to create a new document such as a new space, page, document or other content item. The request can be made via a UI of the collaboration system. The request can include information about the type of document being created, such as a topic associated with the document, an intended audience (e.g., group, department, etc.) for the document, and so on. In some cases, the collaboration system may determine this information based on the context of the user's interactions with the system, profile data associated with the user, historical interaction data that is collected by the user and so on. Additionally or alternatively, the collaboration system can prompt the user for information about the document such as a topic and/or an associated group.

In some cases, in response to receiving the request to generate the new content item, the collaboration system can analyze content items associated with the user account to determine a template attribute. For example, the collaboration system can determine one or more groups, teams, or organizations that the user account is associated with, and the template attribute can be a common theme such as a defined template associated with a group or team. In other cases, the collaboration system can analyze documents generated by the user to determine common features such a specific formatting that is contained in the user's content items. This can be done using machine learning, natural language processing, or other suitable analysis techniques. The collaboration system can use the attribute to determine a template for generating a new content item.

At step 704 the process 700 can include determining and displaying an automation rule for creating new content items. The automation rule can include the determined template that is used to create the new content item and criteria for applying the automation rule to the additional documents. For example, if the template was determined based on a group the user account is associated with, then the criteria can include using the determined template for documents generated for that specific group. In some cases, the recommendation engine can include a machine learning component that can operate to identify potential templates based on analyzing historical data associated with the collaboration system and/or current user interaction data. The automation rule can be applied to generate a template for creating the new document and/or can be applied to other documents created/owned by other users of the collaboration system. For example, upon generating and executing an automation rule for a first user, the collaboration system can suggest the automation rule be applied to other documents being created by other users. This can include presenting the automation rule to other users who have documents that meet the rule conditions.

At step 706, the process 700 can include displaying the automation rule in a user interface. The automation rule can be displayed for the user to review prior to applying the automation to the documents, as described herein. In some cases, displaying the automation rule can include displaying one or more user interface elements for performing actions associated with the automation rule. Displaying the automation rule can include displaying the determined template along with the criteria for applying the automation rule to additional documents. Displaying the automation rule can also include displaying a user interface element for accepting the automation rule, and a user interface element for modifying the automation rule. In some cases, the collaboration system can also display an option to decline the automation rule in the UI. In some cases, the collaboration system can show a preview of the changes that would occur as a result of implementing the rule.

At step 708, the process 700 can include updating one or more additional documents in accordance with the automation rule. In this example, the collaboration system can launch a defined template in response to the request to create a new document. In this regard, the automation rule may facilitate organizing and formatting documents in a uniform manner across pages, topics, different users, groups of users, and/or the like. Additionally or alternatively, updating the additional documents can include reformatting documents according to the template defined in the automation rule. Accordingly, the use of automation rules can help unify the formatting of content generated by different users of the system. Additionally, if a team, group or organization decides to update a template, the automation rule can be used to update content items according to the new template. Additionally or alternatively, updating the documents can include executing the automation rule when a new document is created such that the template is applied to the new document at creation.

Figure 8:
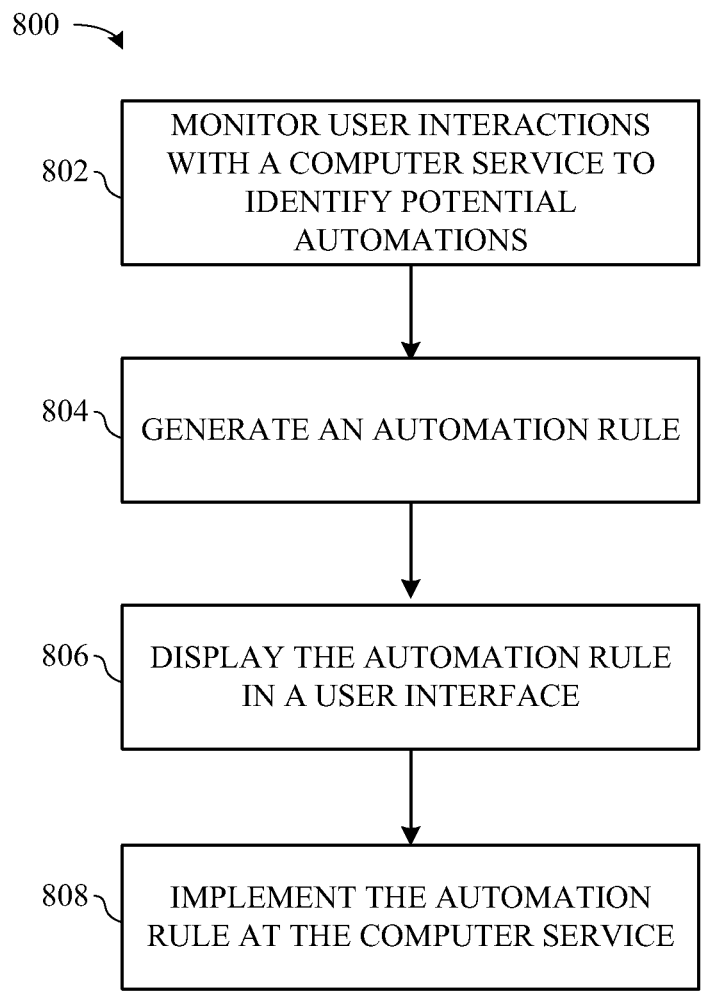
FIG. 8 shows an example process for generating an automation rule that can be implemented in other computer services.

FIG. 8 shows an example process 800 for generating an automation rule that can be implemented in other computer services such as a content feed service, messaging platform; issue tracking platform, email management system, and so on. The process may be performed by an automation system such as the collaboration system 100 described herein.

At 802, the process 800 includes monitoring user interactions with a computer service to identify one or more potential automations. For example, the computer service can be a content feed service that retrieves and displays content to a user such as articles, blog posts, and so on. The user can interact with the content such as by liking it, commenting on it, sharing, modifying or performing other actions associated with the content. The collaboration system can monitor these interactions to identify potential automations. In some cases, the collaboration system can identify actions or tasks that are regularly performed by a user. This can include identifying tasks or actions that have one or more common characteristics. For example, in some cases, the collaboration system may identify that a particular user frequently shares content that is associated with a specific content type. In other cases, the collaboration system can determine that a user frequently forwards content items from a particular source to the same group of users. In yet other cases, the collaborations system can determine that a user frequently saves content that is received from a particular user. In these cases, the collaboration system can identify these interactions and determine to generate an automation rule that can be implemented at the computer service.

At 804, the process 800 can include generating an automation rule for performing a particular task and/or action at a computer service such as a content feed service. Determining to generate an automation rule can be based on a number of criteria. In some case, a frequency of a task or action can be tracked and once that frequency satisfies a threshold, the collaboration system can generate an automation rule for that task. For example, in the context of a content feed service, the collaboration system can determine a percentage or number of times that a user forwards a particular content type to a group of users. When that percentage or number satisfies a defined threshold, the collaboration system can generate an automation rule for performing that forwarding action and present the automation rule to the user.

In some cases, the automation rule can be derived from the action that was performed by the user. For example, in the case of a user forwarding a particular type of content to a group of users, the automation rule can be generated to perform this task automatically. This can include the collaboration services identifying that a particular type of content has populated the user's content feed and automatically forwarding that content to the defined group of users.

In other cases, automation rules can be created for other actions or task performed by users of a computer service.

More generally, event logs, user-interaction logs, or other stored data associated with past user activity may be analyzed as part of operation 804. In some cases, a set of event logs are analyzed using a machine-learning trained model that has been trained using prior events and desired proposed automation rules or sequences. Using the model, a set of event logs can be used to identify or determine an automation rule to be presented to the user. The rule may reflect tasks that have been manually performed in the past or, alternatively, may suggest new tasks (to be automated) that have not previously been performed by the user. In this way, the system may be used to enable functionality or efficiencies not previously encountered by the user thereby improving computer system performance or efficiencies. The model or analysis of operation 804 may be trained or adapted to suggest automations that improve the overall performance of the networked system in addition to improving operational efficiencies by eliminating manual user input and step-by-step interactions normally associated with a non-automated series of tasks.

At 806, the process 800 can include displaying the automation rule to the user. The automation rule can be displayed for the user to review prior to applying the automation to the perform the defined actions or tasks, as described herein. In some cases, displaying the automation rule can include displaying one or more user interface elements for performing actions associated with the automation rule. Displaying the automation rule can include displaying the determined template or rule along with the criteria for implementing the automation rule at the computer service. The template or rule may include a set of conditions or precursors that are used to trigger the rule and a set of tasks or operations that will be performed when the set of conditions are satisfied. The template or rule may also display an indicia of the objects, or object types that are subject to the rule. Displaying the automation rule can also include displaying a user interface element for accepting the automation rule, and a user interface element for modifying the automation rule. In some cases, the collaboration system can also display an option to decline the automation rule in the UI. In some cases, the collaboration system can show a preview of the changes that would occur as a result of implementing the automation rule.

In the example of a content feed service, displaying the automation rule can include displaying a window or other graphical object that provides a summary of the rule. For example, the display can include a set of conditions that trigger the rule, a set of tasks or operations to be performed when triggered, and the items, objects, or types of objects subject to the rule. The display may include a description or series of elements that specifies a condition precedent or trigger condition, an action, and a subject of the action. With respect to a feed service, the trigger may be a change to a particular content item or class of content items, the action may be a forward, posting, or messaging action, and the subject may be a particular type of feed item (issue tracking feed item, wiki-post feed item, content posting feed item, etc.). The user can accept the automation rule and/or modify the rule. For example, the user can further define the type of content that is forwarded by adding limitations or definitions to the content type. Additionally or alternatively, the user can add, remove or otherwise modify the group of users who receives the content as a result of the automation rule.

At 808, the process 800 can include implementing the automation rule at the computer service such as the content feed service. Once implemented the collaboration system can monitor the user's content feed and determine when content item satisfying an automation rule criteria is received. Upon determining that a content item satisfies the automation rule criteria, the collaboration system, can perform the action defined by the automation rule. For example, in the cases of the content feed service, the collaboration can identify that content from a particular source was received by a user's content feed and forward that content item to the group of user's defined in the automation rule. In some cases, the collaboration system can notify the user that the automation rule was performed. For example, the collaboration rule can display a visual indicator with the associated content item to notify the user that the automation rule forwarded the content item to the group of users.

Figure 9:
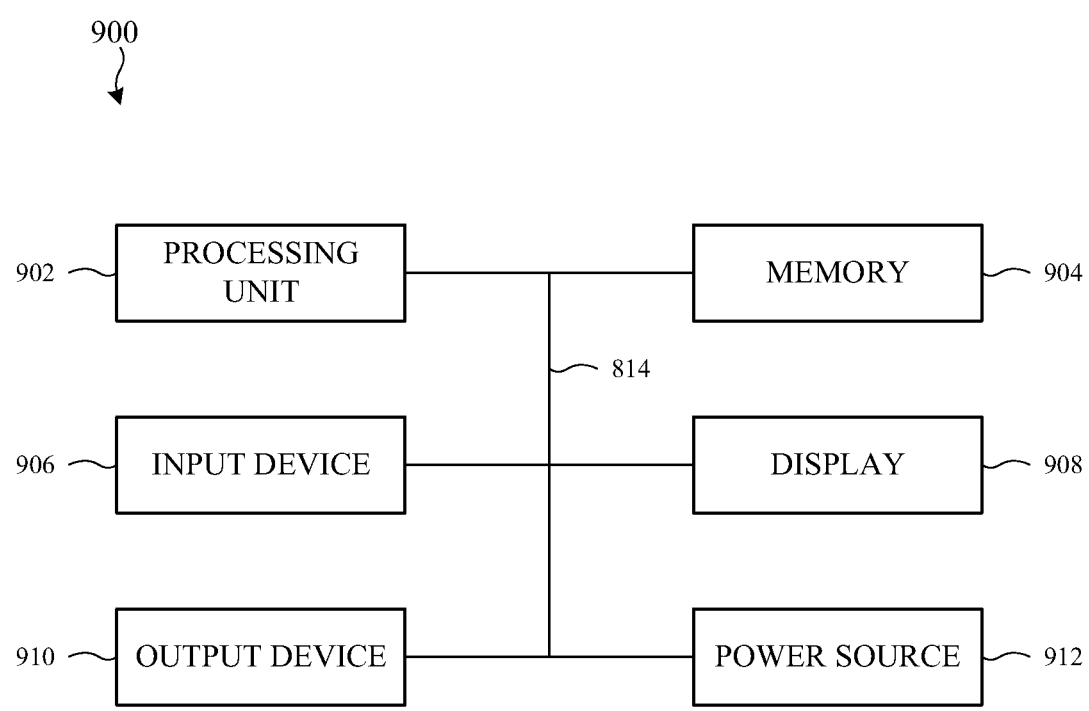
FIG. 9 shows a sample electrical block diagram of an electronic device that may perform the operations described herein.

FIG. 9 shows a sample electrical block diagram of an electronic device 900 that may perform the operations described herein. The electronic device 900 may in some cases take the form of any of the electronic devices described with reference to FIGS. 1-8, including client devices, and/or servers or other computing devices associated with the collaboration system 100. The electronic device 900 can include one or more of a display 908, a processing unit 902, a power source 912, a memory 904 or storage device, input devices 906, and output devices 910. In some cases, various implementations of the electronic device 900 may lack some or all of these components and/or include additional or alternative components.

The processing unit 902 can control some or all of the operations of the electronic device 900. The processing unit 902 can communicate, either directly or indirectly, with some or all of the components of the electronic device 900. For example, a system bus or other communication mechanism 914 can provide communication between the processing unit 902, the power source 912, the memory 904, the input device(s) 906, and the output device(s) 910.

The processing unit 902 can be implemented as any electronic device capable of processing, receiving, or transmitting data or instructions. For example, the processing unit 902 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 900 can be controlled by multiple processing units. For example, select components of the electronic device 900 (e.g., an input device 906) may be controlled by a first processing unit and other components of the electronic device 900 (e.g., the display 908) may be controlled by a second processing unit, where the first and second processing units may or may not be in communication with each other.

The power source 912 can be implemented with any device capable of providing energy to the electronic device 900. For example, the power source 912 may be one or more batteries or rechargeable batteries. Additionally or alternatively, the power source 912 can be a power connector or power cord that connects the electronic device 900 to another power source, such as a wall outlet.

The memory 904 can store electronic data that can be used by the electronic device 900. For example, the memory 904 can store electronic data or content such as, for example, audio and video files, documents and applications, device settings and user preferences, timing signals, control signals, and data structures or databases. The memory 904 can be configured as any type of memory. By way of example only, the memory 904 can be implemented as random access memory, read-only memory, Flash memory, removable memory, other types of storage elements, or combinations of such devices.

In various embodiments, the display 908 provides a graphical output, for example associated with an operating system, user interface, and/or applications of the electronic device 900 (e.g., a chat user interface, an issue-tracking user interface, an issue-discovery user interface, etc.). In one embodiment, the display 908 includes one or more sensors and is configured as a touch-sensitive (e.g., single-touch, multi-touch) and/or force-sensitive display to receive inputs from a user. For example, the display 908 may be integrated with a touch sensor (e.g., a capacitive touch sensor) and/or a force sensor to provide a touch- and/or force-sensitive display. The display 908 is operably coupled to the processing unit 902 of the electronic device 900.

The display 908 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 908 is positioned beneath and viewable through a cover that forms at least a portion of an enclosure of the electronic device 900.

In various embodiments, the input devices 906 may include any suitable components for detecting inputs. Examples of input devices 906 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 906 may be configured to detect one or more particular types of input and provide a signal (e.g., an input signal) corresponding to the detected input. The signal may be provided, for example, to the processing unit 902.

As discussed above, in some cases, the input device(s) 906 include a touch sensor (e.g., a capacitive touch sensor) integrated with the display 908 to provide a touch-sensitive display. Similarly, in some cases, the input device(s) 906 include a force sensor (e.g., a capacitive force sensor) integrated with the display 908 to provide a force-sensitive display.

The output devices 910 may include any suitable components for providing outputs. Examples of output devices 910 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 910 may be configured to receive one or more signals (e.g., an output signal provided by the processing unit 902) and provide an output corresponding to the signal.

In some cases, input devices 906 and output devices 910 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 902 may be operably coupled to the input devices 906 and the output devices 910. The processing unit 902 may be adapted to exchange signals with the input devices 906 and the output devices 910. For example, the processing unit 902 may receive an input signal from an input device 906 that corresponds to an input detected by the input device 906. The processing unit 902 may interpret the received input signal to determine whether to provide and/or change one or more outputs in response to the input signal. The processing unit 902 may then send an output signal to one or more of the output devices 910, to provide and/or change outputs as appropriate.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed only for legitimate, agreed-upon, and reasonable uses.

Example computing resources or appliances that may be configured to perform the methods described herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

The foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed for leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated for leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A computer-implemented method for generating an automation for a content collaboration system, the computer-implemented method comprising:
    displaying graphical objects corresponding to documents hosted by the content collaboration system at a navigation pane of the content collaboration system;
    determining a deviation metric using a hierarchical structure of the documents and a reference structure;
    in response to the deviation metric satisfying a criteria:
    determining a suggested change to the hierarchical structure of documents, the change to the hierarchical structure based on the reference structure; and
    causing display of an automation rule for the change to the hierarchical structure of the documents;
    in response to displaying the automation rule, causing display of a first user interface element for accepting the automation rule and a second user interface element for modifying the automation rule;
    in response to receiving an input indicating the acceptance of the automation rule, executing the automation rule to:
    update the hierarchical structure of the documents;
    determine one or more additional deviation metrics using a hierarchical structure of one or more additional documents and the reference structure; and
    in accordance with the automation rule, update hierarchical structures of the one or more additional documents having a respective deviation metric that satisfies the criteria.

2. The computer-implemented method of claim 1, wherein:
    the hierarchical structure of the graphical objects comprises a nodal relationship of the graphical objects;
    the reference structure comprises a predefined nodal relationship; and determining the deviation metric comprises determining differences between the
    nodal relationship of the graphical objects and the defined nodal relationship.

3. The computer-implemented method of claim 1, further comprising: in response to receiving a user selection of the second user interface element to
    modify the automation rule prior to receiving the user selection of the first user interface element for accepting the automation rule, causing display of an editable interface that includes one or more options to modify the automation rule; and
    in response to receiving a user input in the editable interface, updating the automation rule in accordance with the modified automation rule.

4. The computer-implemented method of claim 3, wherein: displaying the automation rule in the editable interface includes displaying a third
    option to decline the automation rule; and in response to receiving the user selection of the third option to decline the automation rule, saving the user selection and rule in a database.

5. The computer-implemented method of claim 1, wherein:

in response to receiving the input indicating the acceptance of the automation rule, causing the display of a preview of the automation rule to the displayed graphical objects; and in response to displaying the effect of applying the automation rule to the displayed graphical objects, displaying an option to modify the automation rule prior to executing the automation rule.

6. The computer-implemented method of claim 1, wherein: the documents are organized in a page tree structure; and the change to the hierarchical structure comprises modifying the page tree structure of the documents.

7. The computer-implemented method of claim 6, wherein modifying the page tree structure of the documents comprises removing one or more hierarchical levels from the hierarchical structure of the documents.

8. The computer-implemented method of claim 6, wherein modifying the page tree structure of the documents comprises adding one or more hierarchical levels to the hierarchical structure of the documents.

9. The computer-implemented method of claim 1, wherein the one or more additional documents are documents that are not currently displayed in the navigation pane.

\* \* \* \* \*